(12) United States Patent
Lin

(10) Patent No.: US 8,267,538 B2
(45) Date of Patent: Sep. 18, 2012

(54) ILLUMINATING DEVICE HAVING POINT LIGHT SOURCE

(75) Inventor: Tsung-Yu Lin, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 423 days.

(21) Appl. No.: 12/605,427

(22) Filed: Oct. 26, 2009

(65) Prior Publication Data

US 2010/0128487 A1    May 27, 2010

(30) Foreign Application Priority Data

Nov. 27, 2008 (CN) .......................... 2008 1 0305765

(51) Int. Cl.
*F21V 5/00* (2006.01)
(52) U.S. Cl. .................... 362/97.3; 362/330; 362/311.02
(58) Field of Classification Search .................. 362/617, 362/619, 97.3, 330, 311.02, 311.06; 349/63, 349/64
See application file for complete search history.

(56) References Cited

U.S. PATENT DOCUMENTS

| | | | | |
|---|---|---|---|---|
| 7,088,333 | B1 * | 8/2006 | Manabe et al. | 345/102 |
| 7,255,456 | B2 * | 8/2007 | Yao et al. | 362/225 |
| 7,455,416 | B2 * | 11/2008 | Chen | 362/85 |
| 7,614,776 | B2 * | 11/2009 | Minobe et al. | 362/620 |
| 7,654,719 | B2 * | 2/2010 | Chang | 362/606 |
| 7,722,241 | B2 * | 5/2010 | Chang | 362/620 |
| 7,726,828 | B2 * | 6/2010 | Sato | 362/97.3 |
| 7,909,496 | B2 * | 3/2011 | Matheson et al. | 362/609 |

* cited by examiner

*Primary Examiner* — Peggy A. Neils
(74) *Attorney, Agent, or Firm* — Altis Law Group, Inc.

(57) ABSTRACT

An illuminating device includes a light source and a light diffusing plate. The light diffusing plate includes a light pervious substrate and a light diffusing structure. The light pervious substrate has a lower surface adjacent to the light source and an upper surface at an opposite side of the substrate to the lower surface. A through hole is defined in the substrate to expose a central portion of the light source. The light diffusing structure is formed at the upper surface and includes a plurality of first lens arrays radially extending from the through hole and a plurality of second lens arrays each arranged between two adjacent first lens arrays.

14 Claims, 3 Drawing Sheets

ILLUMINATING DEVICE HAVING POINT LIGHT SOURCE

BACKGROUND

1. Technical Field

The present disclosure relates generally to illuminating devices, in particular, an illuminating device having a point light source.

2. Description of Related Art

Currently, light emitting diodes (LEDs) have been widely employed in various illuminating devices to replace cold cathode fluorescent lamps (CCFLs) due to their excellent light emission spectrum. The emitted light from a LED usually has a taper shaped distribution, and the intensity of the light decreases from a central axis of the taper to an outer thereof. To provide a uniform surface light device, a light diffusing unit (e.g., a light guide plate) is provided to diffuse the light emitted from the LED. However, as a common issue with the light guide plates, total reflection usually occurs at surfaces of the light guide plate, resulting in a very low emission efficient of the surface light device.

Therefore, there is a desire to provide a new surface light device having improved light emission efficiency.

BRIEF DESCRIPTION OF THE DRAWINGS

Many aspects of the present illuminating device can be better understood with references to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
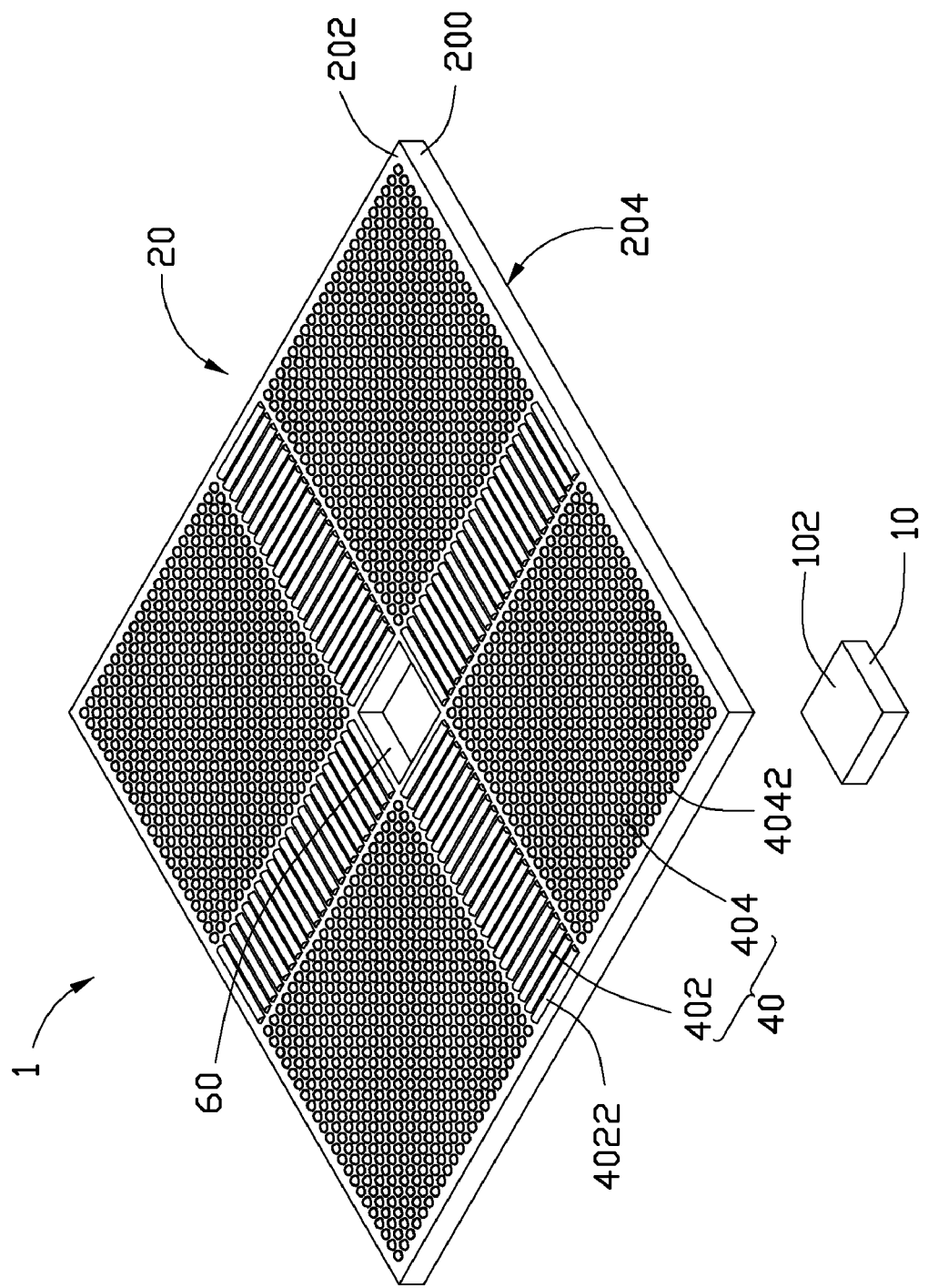
FIG. 1 is an exploded isometric view showing an illuminating device in accordance with an embodiment.
Figure 2:
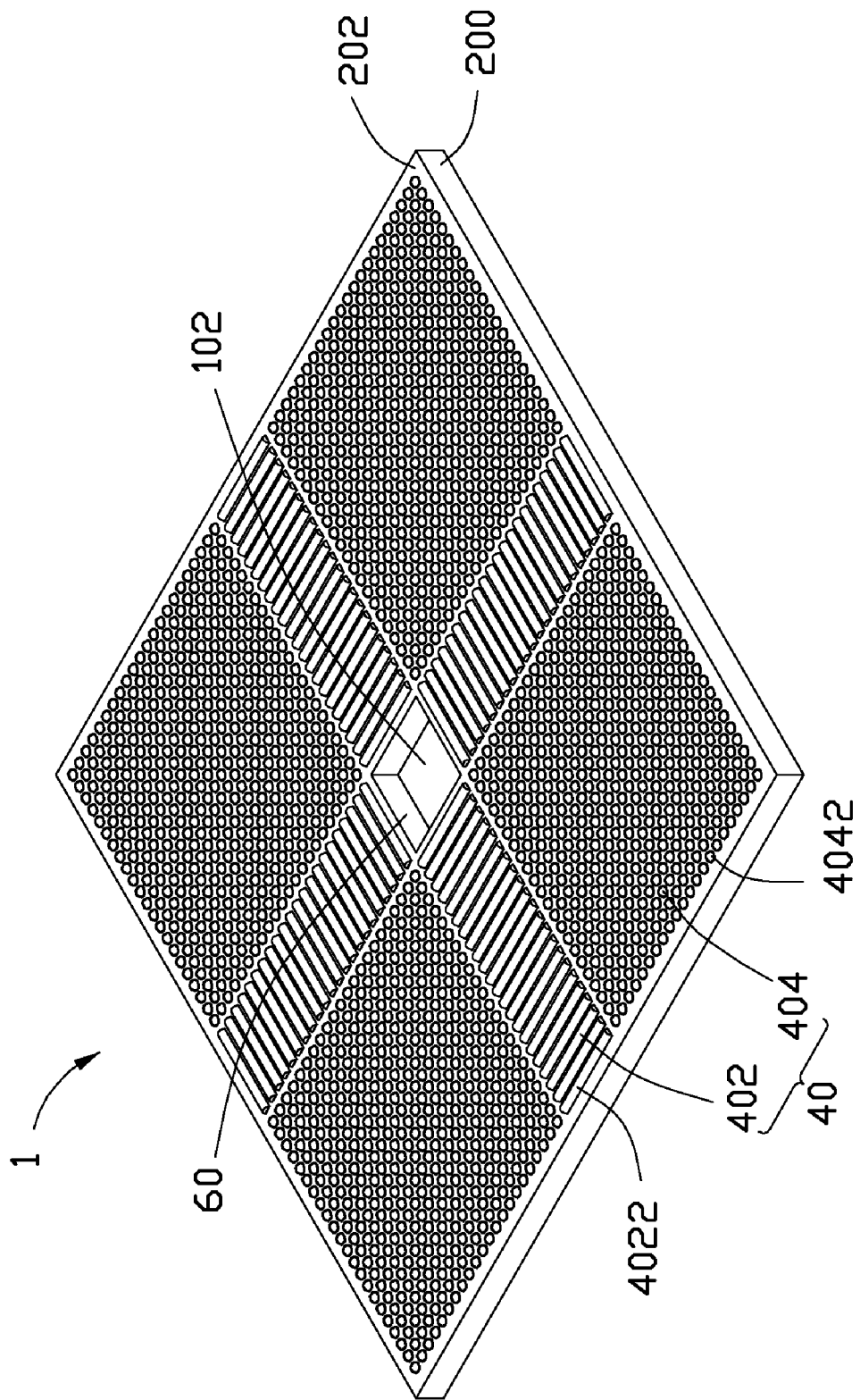
FIG. 2 is an assembled isometric view showing the illuminating device of FIG. 1.
Figure 3:
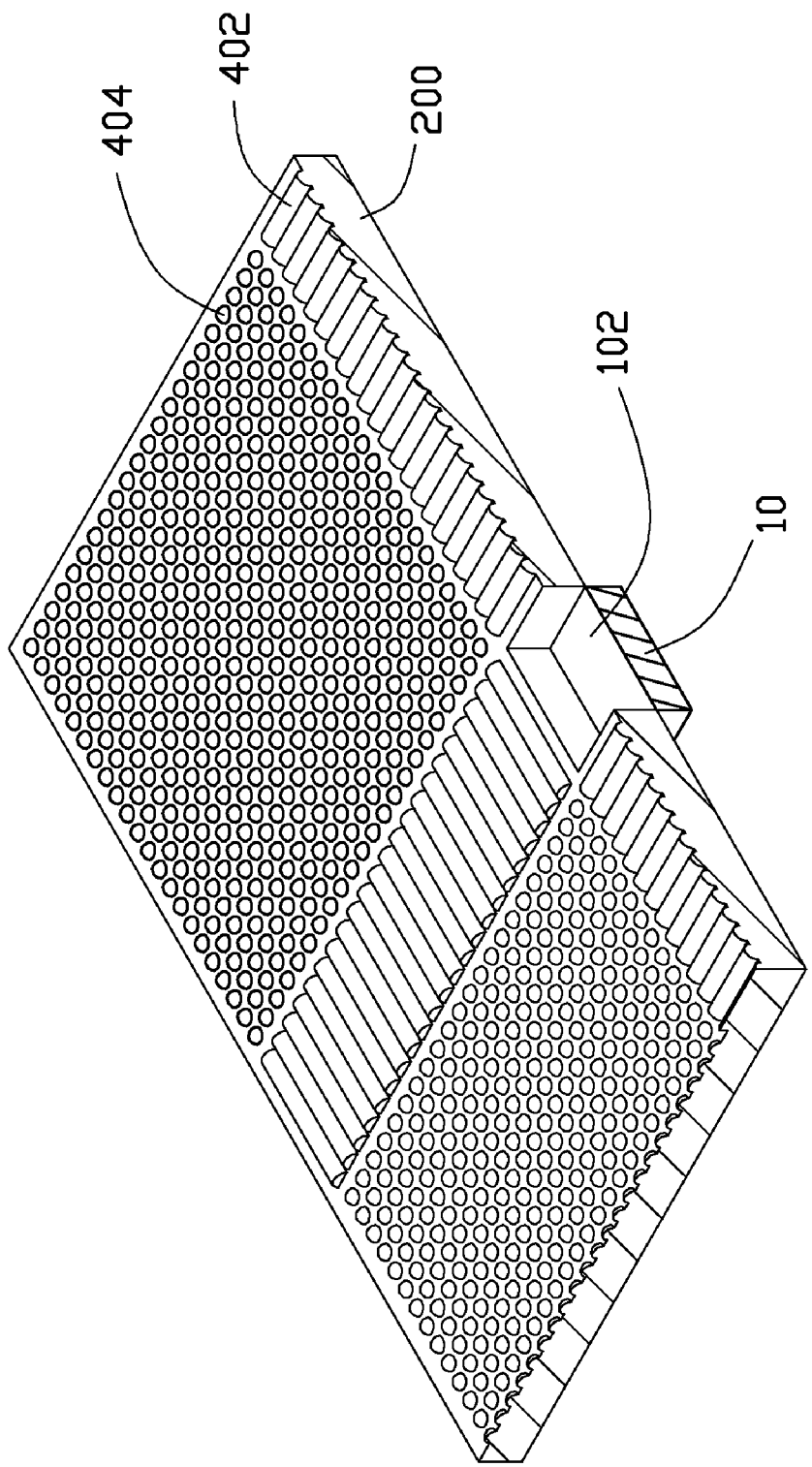
FIG. 3 is an isometric cross sectional view of the illuminating device of FIG. 2.

Referring to FIGS. 1 to 3, an illuminating device 1 in accordance with an embodiment includes a light source 10 and a light diffusing plate 20 adjacent to the light source 10.

The light source 10 is a point type light source. In the present embodiment, the light source 10 is a packaged LED having a square light emitting surface 102.

The light diffusing plate 20 includes a light pervious substrate 200 and a light diffusing structure 40. A thickness of the substrate 200 is in the range from approximately 100 micrometers to 1 millimeter. The substrate 200 can be transparent, and includes an upper surface 202 facing away from the light emitting surface 102 of the light source 10 and an opposite lower surface 204 adjacent to the light emitting surface 102 of the light source 10. The light emitting surface 102 of the light source 10 can be adhered to the lower surface 204 of the substrate 200, or spaced apart from the light source 10. The substrate 200 defines a through hole 60 in a central portion thereof. The through hole 60 is exposed at both of the upper and lower surfaces 202, 204. The through hole 60 has a cross section approximately same as the light emitting surface 102 of the light source 10. A size of the cross section of the through hole 60 is preferably slightly less than that of the light emitting surface 102, thus that a central portion of the light emitting surface 102 can be exposed at the through hole 60, and light emitted from the central portion of the light source 10 can pass through the through hole 60. The through hole 60 can be circular, or polygonal. In the illustrated embodiment, a size of the cross section of the through hole 60 is slightly less than that of the light emitting surface 102, a central portion of the light emitting surface 102 is exposed at the through hole 60, and a peripheral portion of the light emitting surface 102 is adhered to the lower surface 204. The cross section of the through hole 60 is a square having four sides, and a length of each side of the square is in the range from approximately 50 micrometers to 5 millimeters.

The light diffusing structure 40 is formed at the upper surface 202 of the substrate 200, and includes a plurality of first lens arrays 402 radially extending from the through hole 60 and a plurality of second lens arrays 404 each arranged between two adjacent first lens arrays 402. In other words, the first lens arrays 402 are radially formed at the upper surface around the through hole 60. In the illustrated embodiment, the first and second lens arrays 402, 404 are protrude beyond the upper surface 202 of the substrate 200.

Each of the first lens arrays 402 includes a plurality of uniformly distributed column shaped lenses 4022 paralleled each other and defined along an aligning direction, which is perpendicular to a central axis of the through hole 60. The column shaped lenses 4022 in each of the first lens arrays 402 are arranged along a corresponding aligning direction from the central portion of the substrate 200 to a peripheral portion of the substrate 200. The column shaped lenses 4022 in each of the first lens arrays 402 have central axes parallel to each other and all perpendicular to the central axis of the through hole 60 and the corresponding aligning direction. Preferably, the aligning directions of the first lens arrays 402 are equiangularly arranged around the central axis of the through hole 60. A cross section of each of the column shaped lenses 4022 can be semi-circular, triangle-shaped, or trapezium shaped. In the present embodiment, the cross section of column shaped lenses 4022 is semi-circular, and has a diameter in the range from approximately 40 micrometers to approximately 60 micrometers.

If the cross section of the through hole 60 is a polygon having a plurality of adjoining sides, the number of the first lens arrays 402 is preferably equal to that of the sides of the cross section of the through hole 60, and each of the first lens arrays 402 is preferably arranged adjacent and perpendicular to a corresponding side of the cross section of the through hole 60. That is, the column shaped lenses 4022 in each of the first lens arrays 402 is parallel to the corresponding side, and has a same length to the corresponding side. In other words, column shaped lenses 4022 are densely distributed at the upper surface 202 in a portion adjacent to the through hole 60, and are relatively sparsely distributed on the upper surface 202 in a portion distal from the through hole 60. In the present embodiment, the through hole 60 is a square through hole. Thus, according to the configuration discussed above, there are four first lens arrays 402 arranged around the through hole 60 to constitute a cross structure on the substrate 200.

The second lens arrays 404 are arranged on portions of the upper surface 202 of the substrate 200 that are not covered by the first lens arrays 402. Specifically, each of the second lens arrays 404 is formed between each two adjacent first lens arrays 402. Each of the second lens arrays 402 includes a number of uniformly distributed semi-sphere shaped lenses 4042, and a diameter of each of the semi-shaped lenses 4042 is in the range from approximately 10 micrometers to about 500 micrometers.

As described above, the column shaped lenses 4022 and the semi-sphere shaped lenses 4042 are convex lenses protruding beyond the upper surface 202 of the substrate 200. However, it is understood that the column shaped lenses 4022 and the semi-sphere shaped lenses 4042 can also be recessed below the upper surface 202 of the substrate 200. In addition, column shaped lenses 4022, the semi-sphere shaped lenses 4042, and the substrate 200 can be integrally formed into a unitary piece. The first lens arrays 402 and the second lens arrays 404 together can cover 10% to 90% areas of the upper surface 202 of the substrate 200.

In the presently illustrated illuminating device 1, light emitted from a central portion of the light source 10 can mainly directly passes through the through hole 60 to form a bright light beam, and light emitted from a peripheral portion of the light source 10 may enter into the light diffusing plate 20. As the light diffusing structure 40 can eliminate the total reflection condition of the light in the diffusing plate 20, light in the light diffusing plate 20 can be reflected by the light diffusing structure 40 and thereby uniformly emitted out from the light diffusing plate 20. Thus, a light utilizing efficiency of the light source 10 is improved.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope of the appended claims.

The invention claimed is:

1. An illuminating device, comprising:
a light source having a light emitting surface; and
a light diffusing plate comprising:
a light pervious substrate having a lower surface adjacent to the light emitting surface and an upper surface at an opposite side of the substrate to the lower surface, a through hole being defined in the substrate to expose a central portion of the light emitting surface of the light source, a cross section of the through hole being a polygon with a plurality of sides; and
a light diffusing structure formed at the upper surface, the light diffusing structure including a plurality of first lens arrays radially extending from the through hole and a plurality of second lens arrays each arranged between two adjacent first lens arrays, the number of the first lens arrays being equal to that of the sides of the cross section of the through hole, each of the first lens arrays comprising a plurality of column shaped lenses parallel to each other and arranged at a corresponding side of the cross section of the through hole with the aligning direction being perpendicular to the corresponding side, the column shaped lenses in each of the first lens arrays having a same length as the corresponding side of the cross section of the through hole.

2. The illuminating device of claim 1, wherein each of the first lens arrays is aligned along an aligning direction perpendicular to a central axis of the through hole, and central axes of the column shaped lenses are perpendicular to the corresponding aligning direction and the central axis of the through hole.

3. The illuminating device of claim 2, wherein a cross section of each of the column shaped lenses is semi-circular, triangle-shaped, or trapezium-shaped.

4. The illuminating device of claim 2, wherein a cross section of each of the column shaped lenses is semi-circular, and each of the column shaped lenses has a diameter in the range from approximately 40 micrometers to approximately 60 micrometers.

5. The illuminating device of claim 1, wherein each of the second lens arrays comprises a plurality of semi-sphere shaped lenses, and central axes of the semi-sphere shaped lenses in each of the second lens arrays are parallel to a central axis of the through hole.

6. The illuminating device of claim 1, wherein a peripheral portion of the light emitting surface of the light source is in contact with the lower surface of the substrate.

7. The illuminating device of claim 1, wherein the first lens arrays and the second lens arrays protrude beyond the upper surface of the substrate.

8. The illuminating device of claim 1, wherein the first lens arrays, the second lens arrays, and the substrate are integrally formed into a unitary piece.

9. The illuminating device of claim 1, wherein the light source includes a light emitting diode.

10. An illuminating device, comprising:
a light source having a light emitting surface; and
a light diffusing plate comprising:
a light pervious substrate having a lower surface adjacent to the light emitting surface and an upper surface at an opposite side of the substrate to the lower surface, a through hole being defined in the substrate and facing the light emitting surface of the light source;
a plurality of first lens arrays radially formed on the upper surface around the through hole, each of the first lens arrays including a plurality of column shaped lenses aligned along an aligning direction perpendicular to a central axis of the through hole; and
a plurality of second lens arrays formed on the upper surface, each of the second lens arrays including a plurality of semi-sphere shaped lenses distributed between each two adjacent first lens arrays.

11. The illuminating device of claim 10, wherein a peripheral portion of the light emitting surface of the light source is in contact with the lower surface of the substrate.

12. The illuminating device of claim 10, wherein the first lens arrays and the second lens arrays protrude beyond the upper surface of the substrate.

13. The illuminating device of claim 10, wherein the first lens arrays, the second lens arrays, and the substrate are integrally formed into a unitary piece.

14. The illuminating device of claim 10, wherein the light source includes a light emitting diode.

* * * * *